(12) United States Patent
Jacques et al.

(10) Patent No.: US 7,753,290 B2
(45) Date of Patent: Jul. 13, 2010

(54) PORTABLE POWERED FOAMING SPRAYER

(75) Inventors: Danny Ray Jacques, Caledonia, MI (US); Blair E. Heethius, Grand Rapids, MI (US); Nicholas D. Jacques, Grand Rapids, MI (US); James R. Fickling, Kentwood, MI (US)

(73) Assignee: Innovative Cleaning Equipment, Inc., Grand Rapids, MI (US)

( * ) Notice: Subject to any disclaimer, the term of this patent is extended or adjusted under 35 U.S.C. 154(b) by 18 days.

(21) Appl. No.: 11/857,228

(22) Filed: Sep. 18, 2007

(65) Prior Publication Data

US 2008/0061166 A1 Mar. 13, 2008

Related U.S. Application Data

(63) Continuation-in-part of application No. 10/647,362, filed on Aug. 25, 2003, now abandoned, which is a continuation of application No. 11/550,157, filed on Oct. 17, 2006, now abandoned.

(60) Provisional application No. 60/418,505, filed on Oct. 15, 2002.

(51) Int. Cl.
*A62C 11/00* (2006.01)
(52) U.S. Cl. ............... 239/329; 239/146; 239/147; 239/525; 239/332
(58) Field of Classification Search ............ 239/526, 239/530, 532, 535, 586, 583, 146, 147, 332, 239/433, 419, 369, 407; 222/145.6, 145.5, 222/190
See application file for complete search history.

(56) References Cited

U.S. PATENT DOCUMENTS

| 2,968,164 | A |   | 1/1961  | Hanson          |         |
|-----------|---|---|---------|-----------------|---------|
| 3,026,045 | A |   | 3/1962  | Reading         |         |
| 3,462,112 | A |   | 8/1969  | Novak et al.    |         |
| 3,940,065 | A |   | 2/1976  | Ware et al.     |         |
| 4,019,652 | A |   | 4/1977  | Suh et al.      |         |
| 4,176,793 | A | * | 12/1979 | Heinrich        | 239/407 |
| 4,571,092 | A |   | 2/1986  | Switall         |         |
| 4,807,544 | A | * | 2/1989  | Cross et al.    | 111/127 |
| 4,844,610 | A | * | 7/1989  | North, Jr.      | 356/73  |
| 4,850,536 | A | * | 7/1989  | Teranishi et al.| 239/332 |
| 5,163,584 | A |   | 11/1992 | Huber et al.    |         |
| 5,381,962 | A |   | 1/1995  | Teague          |         |
| 5,427,181 | A |   | 6/1995  | Laskaris et al. |         |
| 5,525,046 | A | * | 6/1996  | Hartmann        | 417/300 |

(Continued)

*Primary Examiner*—Len Tran
*Assistant Examiner*—Trevor E McGraw
(74) *Attorney, Agent, or Firm*—Warner Norcross & Judd LLP

(57) ABSTRACT

A portable, self-contained powered sprayer to produce a foam effluent spray from a liquid. The sprayer includes segregated air and liquid delivery systems that separately supply air and liquid to a mixing chamber. The liquid delivery system may include a pump for pumping liquid from a tank to the mixing chamber via a liquid supply line. The air delivery system may include a compressor for supplying pressurized air to the mixing chamber via an air supply line. The mixing chamber may be defined within a flow controller. In one embodiment, the sprayer includes control circuit for engaging and disengaging the pump and the compressor in response to operation of the flow controller. The control circuit may include a pressure switch operatively connected to the liquid supply line to trigger operation of the pump and the compressor in response to pressure within the liquid supply line.

9 Claims, 7 Drawing Sheets

U.S. PATENT DOCUMENTS

| | | | |
|---|---|---|---|
| 5,964,412 A * | 10/1999 | Thomas | 239/195 |
| 6,554,207 B2 | 4/2003 | Ebberts | |
| 6,630,033 B2 | 10/2003 | Colicchio | |
| 6,851,583 B2 | 2/2005 | Masuzzo et al. | |
| 6,892,957 B2 | 5/2005 | Bennett et al. | |
| 6,991,041 B2 | 1/2006 | Laskaris et al. | |
| 7,007,826 B2 | 3/2006 | Shapanus et al. | |
| 2004/0256483 A1 | 12/2004 | Guest et al. | |
| 2005/0006400 A1 | 1/2005 | Shapanus et al. | |
| 2005/0279865 A1 | 12/2005 | Thomason et al. | |

* cited by examiner

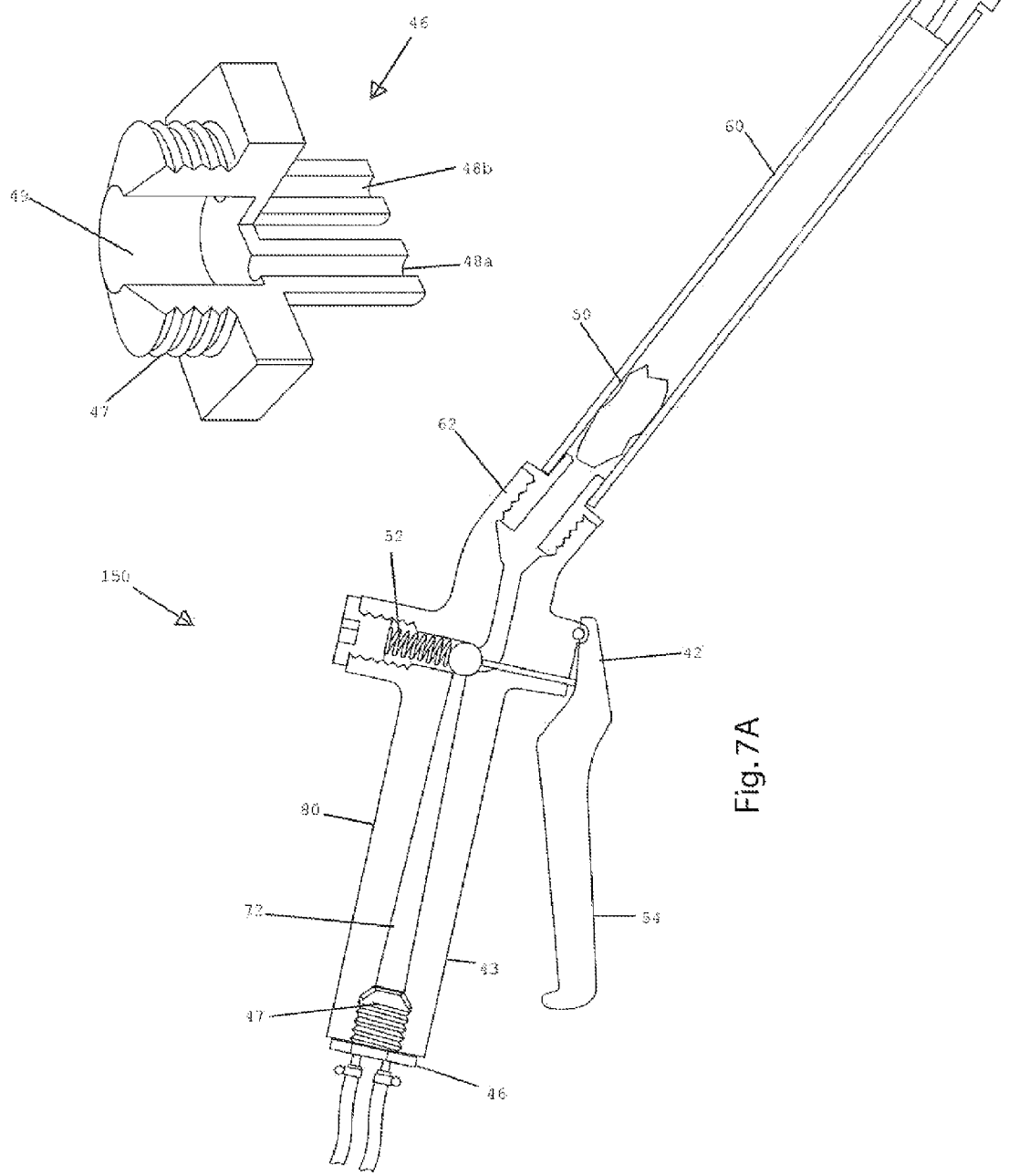

PORTABLE POWERED FOAMING SPRAYER

This application is a continuation-in-part of U.S. patent application Ser. No. 10/647,362, filed Aug. 25, 2003 (now abandoned), which is a non-provisional application of U.S. Provisional Patent Application 60/418,505 filed Oct. 15, 2002. This application is also a continuation of U.S. patent application Ser. No. 11/550,157, filed Oct. 17, 2006 now abandoned.

BACKGROUND OF THE INVENTION

The present invention relates to portable spray units, and more particularly to powered sprayers capable of producing a foam spray.

Portable spray units are used in a wide variety of applications for applying a broad range of liquids. A non-exhaustive list of applications includes: agricultural (pesticides, herbicides, germicides), chemical and janitorial (degreasers, disinfectants, carpet treatments, cleaners, etc.) applications. These sprayers are available in a variety of types. For example, there is a significant market for hand sprayers, which are intended for use in relatively small applications. Typically, hand sprayers are carried by the user and operate through a manually-actuated hand-pump. There is also a significant market for larger sprayers, which typically provide greater delivery rates and improved performance for larger applications. Large commercial sprayers are typically operated through an external supply of compressed air, for example, from an external, stand-alone compressor. In operation, compressed air is supplied to the tank to place the liquid under pressure, and this pressure is used to expel the liquid from the tank.

For many sprayer applications, it is desirable for the spray to be a foamy, heterogeneous mixture of gas and liquid, as opposed to a homogeneous liquid. Possible examples here include the application of pesticides, herbicides, cleaners, etc. There are a variety of advantages to a foamy spray. For example, the consistency of the foam is generally greater than that of a pure liquid, and will thus remain on the applied area for a longer period of time, being less likely to experience run-off. Further, the opaque foam provides a visual indicator to the user as to which areas have already been treated and which have not. Without these properties, there are two possible negative consequences. First, the user may potentially under-apply the spray inasmuch as certain areas might receive no liquid whatsoever and/or the contact time of the liquid with the applied area might be insufficient due to run-off. An alternate possibility is that the user, in an attempt to compensate for the previous drawback, may consistently over-apply the spray. This is an economic disadvantage from the standpoint of greater product consumption, and also possibly a health and/or environmental risk if the applied chemical is hazardous.

There are a variety of commercially available portable, hand-operated foaming sprayers. Perhaps the most effective portable, hand-operated foaming portable sprayer on the market is available from Innovative Cleaning Equipment of Grand Rapids, Mich., under the FOAM-IT trademark. This unit provides highly consistent and readily adjustable foam effluent from a broad range of liquids. The unit also includes a variety of adjustments that permit the characteristics of the effluent to precisely controlled. Despite these benefits, the portable, hand-operated foaming sprayer is not ideal for all applications. In larger applications, it may be desirable to power the spray unit so that the user is not required to repeatedly charge the tank through operation of a hand pump. Further, in larger applications, the standard tank provided with the hand unit may be smaller than desired and therefore require repeated refilling.

As a result, there is a need for an improved powered portable sprayer that can effectively provide higher flow rates while at the same time provide foam of consistent composition and sufficient expansion ratios.

SUMMARY OF THE INVENTION

The aforementioned limitations are overcome by the present invention wherein a portable foam spraying unit is provided with a portable power source and separate motive systems for moving air and spray liquid from the tank to the flow controller. In one embodiment, the unit includes separate air and liquid flow lines extending between the tank and the flow controller.

In one embodiment, the unit includes a pump for moving liquid from the tank to the flow controller along a liquid line and a compressor for supplying compressed air to the flow controller along an air line. In this embodiment, the pump and the compressor may be powered by a single portable power source, such as a rechargeable battery. In a battery powered embodiment, specially designed circuitry may include a low-voltage cutoff device that prevents the battery from being fully discharged, which could result in damage to the battery, compressor and/or the pump. When the low-voltage cutoff device detects that the battery voltage is at or below a preset minimum, the power from the battery to the pump and the compressor is stopped and an LED (light emitting diode) is illuminated in order to alert the operator that the battery is in need of maintenance.

In another embodiment, the unit includes shut-off circuitry for shutting-off the compressor and the pump essentially simultaneously when the liquid pressure exceeds a selected value. In use, this allows the unit to go into a stand-by mode when the flow controller is not open. The shut-off circuitry may include a pressure switch integrated into or located downstream from the pump along the liquid line. The shut-off circuitry may also include a relay that operates in response to the output of the pressure switch to shut-off the supply of power to the compressor and the pump.

In a further embodiment, the flow controller may be a conventional flow controller, such as a conventional, manually-operated spray valve, which may be further attached to a spray wand and nozzle. The flow controller may include a mixing structure, defined generally as a mixing chamber. The mixing chamber is the point external to the tank at which the air and the spray liquid streams are combined. The unit may include a mixing medium to mix the air and liquid prior to expulsion. The mixing medium may be located in or at any point downstream from the mixing chamber. In a further embodiment, a three-way valve is provided so as to allow the re-circulation of the fluid through the pump before discharging foam in order to insure that the pump is fully primed.

In another embodiment, the pressure in the liquid line is greater than the pressure in air line during normal operation. In embodiments of this type, a one-way check valve may be located in the air line to prevent liquid from back-flowing out of the mixing chamber down the air line. On the other hand, in embodiments of this type, the liquid line may remain open from the mixing chamber to the pressure switch. As a result, if the pump runs out of liquid, the pressurized air will back-flow down the liquid line and actuate the pressure switch. Accordingly, in this embodiment, the present invention will shut down the pump and air compressor even if the liquid supply runs dry.

The present invention provides an effective, low cost powered portable sprayer that overcomes the significant limitations of previous hand-operated and powered portable foam spray units. The use of two separate motive devices for moving liquid and air to the flow controller provides relatively low power consumption, which can be crucial in battery powered systems. The liquid can be moved using a conventional pump (e.g. a rotary pump) and the air can be moved using a conventional compressor (e.g. a diaphragm compressor). The segregated supply of air and liquid to the flow controller provides improved foam consistency in the effluent. The shut-off subcircuit controls operation of the pump and the compressor essentially simultaneously in response to pressure in the liquid line. This allows the unit to operate in response to operation of the flow controller. For example, when the flow controller is closed, the pressure in the liquid line increases until the pump and the compressor are shut-off. When the flow controller is opened, the pressure in the liquid line is reduced until the pump and the compressor are turned back on. As such, the shut-off subcircuit provides a simple, effective and efficient (particularly from a power consumption standpoint) mechanism for controlling operation of the unit. Further, the use of a pump and compressor eliminates the need for a pressurized tank. As a result, the tank need not be leaktight and therefore may be produced and assembled at a reduced cost. Additionally, by providing an unchecked liquid line between the mixing chamber and the pressure switch, air pressure build-up can be used to shut-off the pump and compressor even in the absence of liquid.

These and other objects, advantages, and features of the invention will be readily understood and appreciated by reference to the detailed description of the preferred embodiment and the drawings.

BRIEF DESCRIPTION OF THE DRAWINGS

FIG. 6 is a sectional view of the flow controller fitting.

FIG. 7a is a sectional view of the flow controller showing the mixing chamber and mixing media.

DETAILED DESCRIPTION OF THE PREFERRED EMBODIMENT

I. Overview

Figure 1:
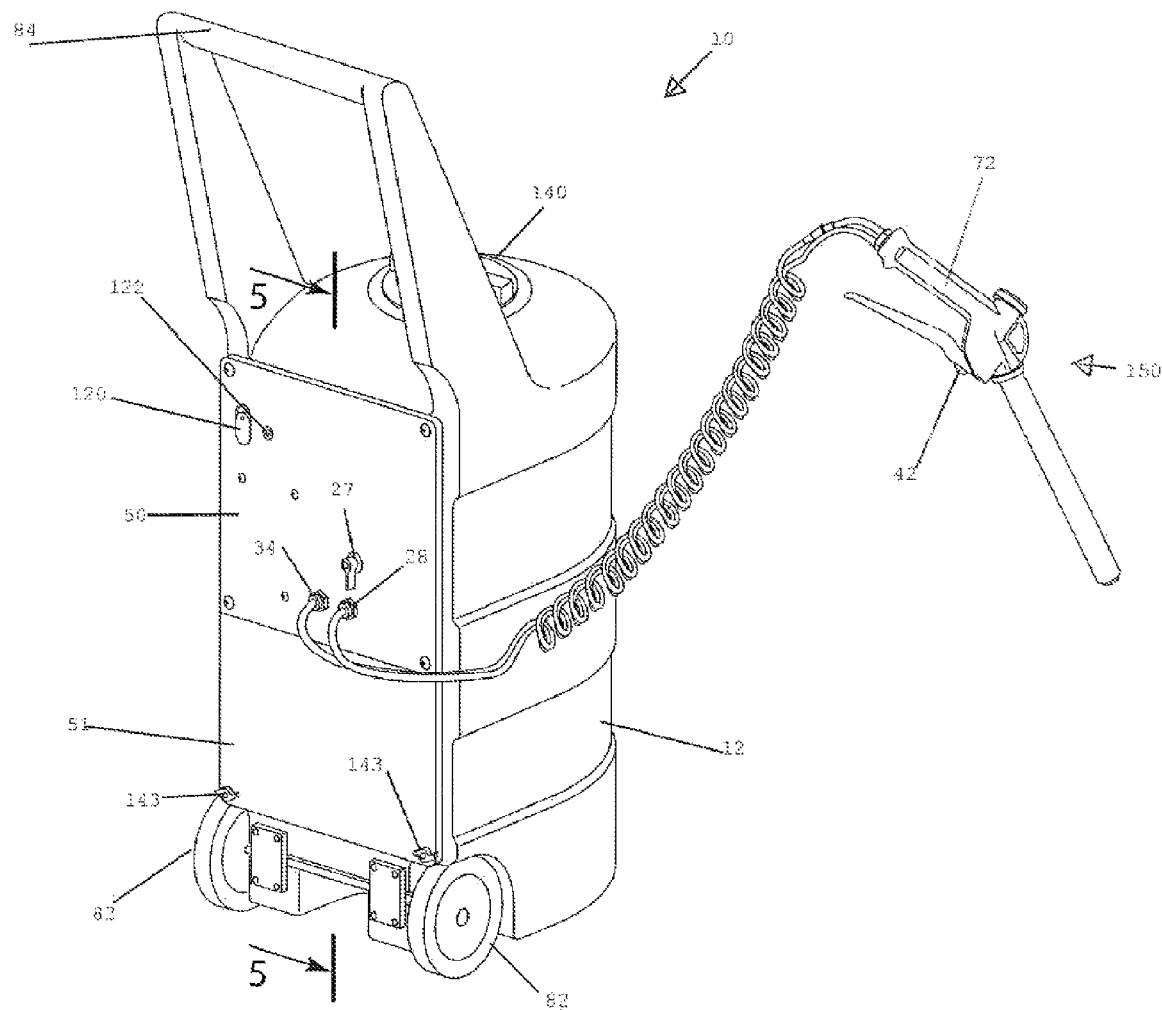
FIG. 1 is a perspective view of a sprayer in accordance with an embodiment of the present invention.
Figure 2:
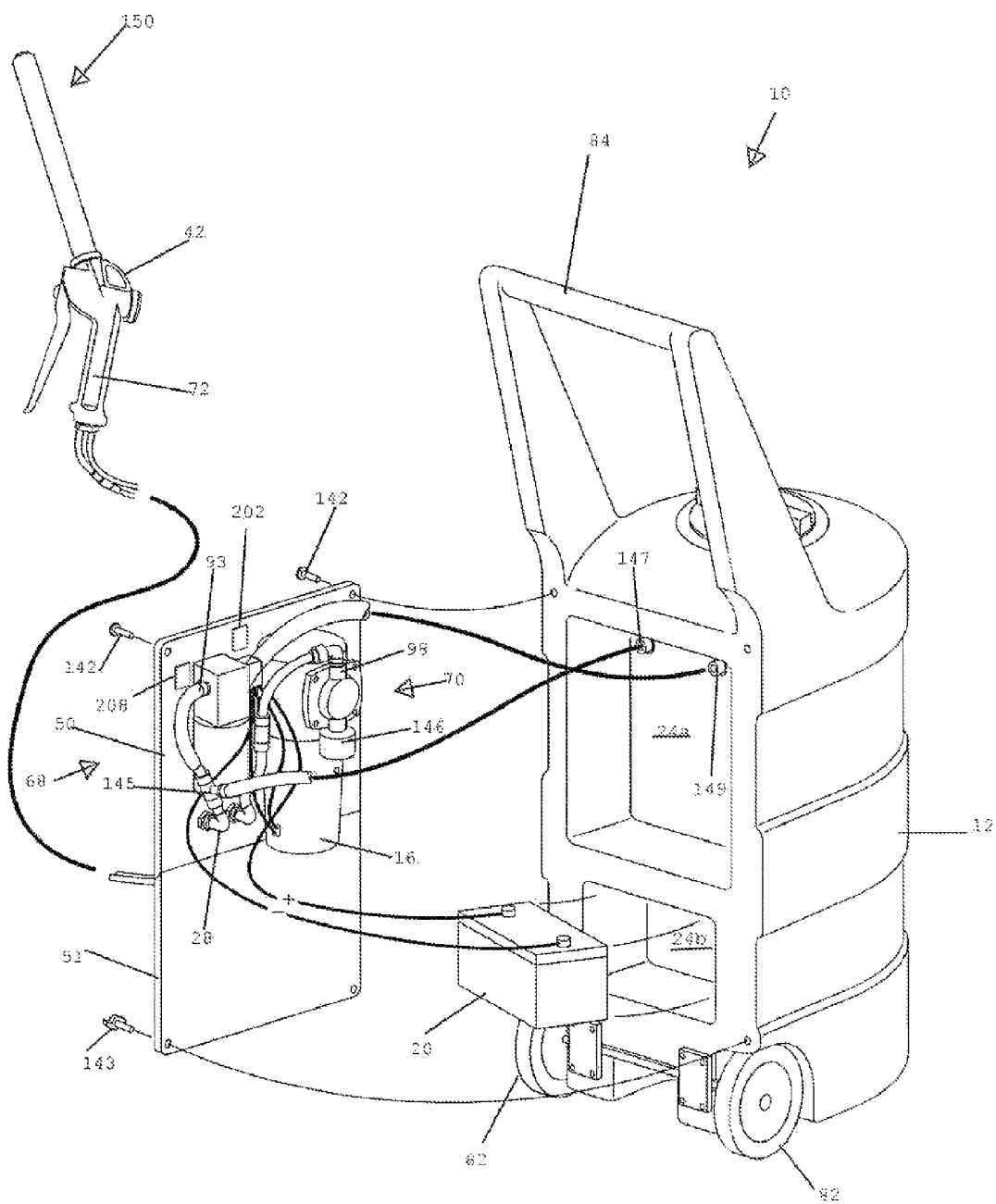
FIG. 2 is a partially exploded perspective view of the sprayer.
Figure 3:
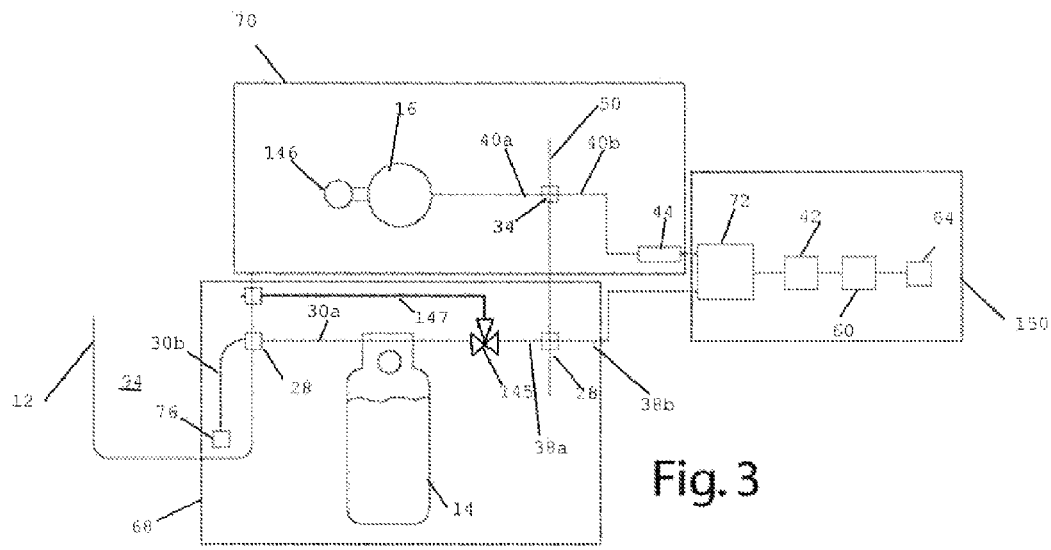
FIG. 3 is a schematic representation of the sprayer.
Figure 4:
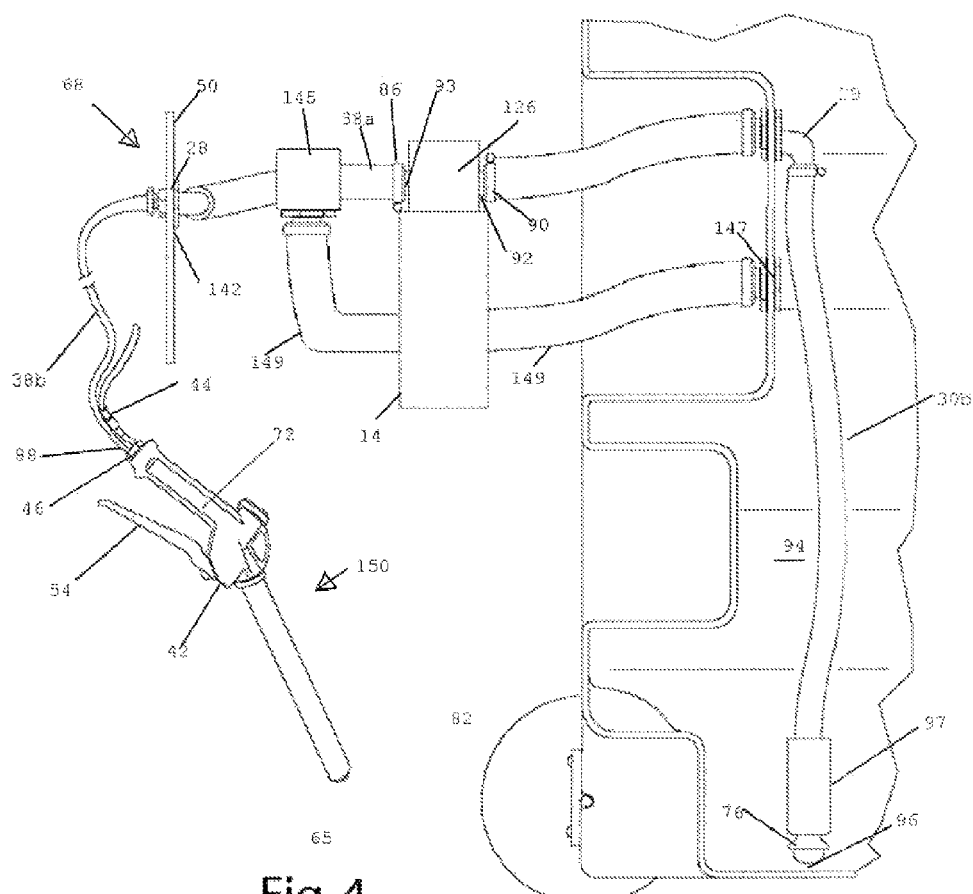
FIG. 4 is an illustration of the liquid delivery system.
Figure 5:
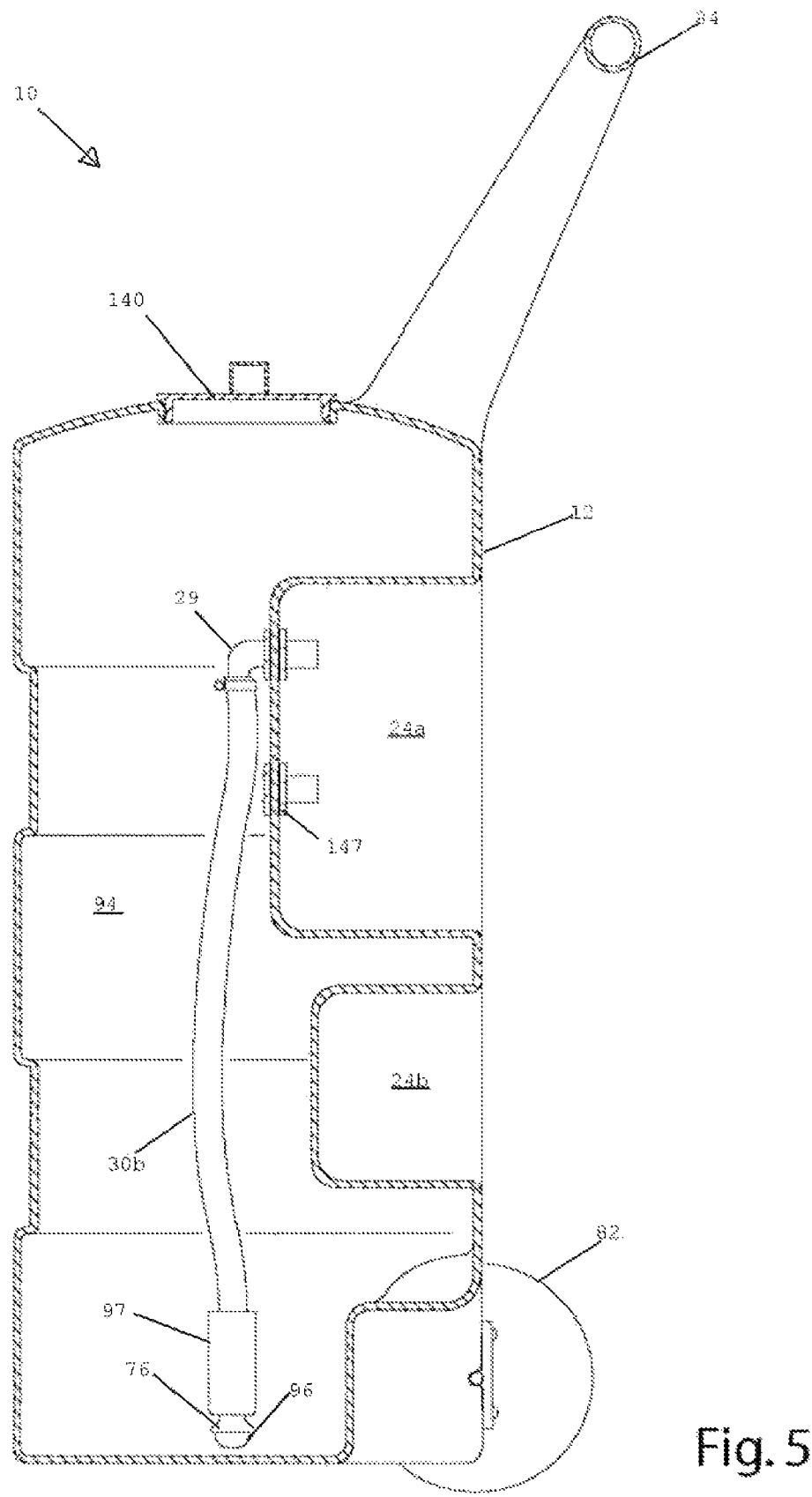
FIG. 5 is a sectional view of the sprayer showing the interior of the tank taken along line V-V of FIG. 1.

A powered, portable sprayer 10 capable of producing a foam spray according to an embodiment of the present invention is shown in FIGS. 1 and 2. A schematic representation of the primary mechanical components of the illustrated embodiment is shown in FIG. 3. In general, the sprayer 10 includes a tank 12 for holding the liquid to be sprayed, a liquid delivery system 68 and an air delivery system 70 that cooperate to separately supply liquid and air to a spray gun 150. In general, the spray gun 150 defines a mixing chamber 72 for combining the separately-supplied air and liquid, and includes a flow controller 42 for regulating the flow of effluent from the sprayer 10. The liquid delivery system 68 may include a pump 14 for pumping fluid from the tank 12. The air delivery system 70 may include a compressor 16 for producing a supply of compressed air. The sprayer 10 also includes a control circuit 22 (See FIG. 9) for controlling operation of the pump 14 and the compressor 16, as well as a portable power source, such as a rechargeable battery 20. In operation of the illustrated embodiment, the pump 14 and the compressor 16 are operated substantially simultaneously to separately supply air and liquid to the mixing chamber 72. The air and liquid are combined in the mixing chamber 72 to create a foam that is selectively discharged from the sprayer 10 by the flow controller 42. The present invention is described in connection with a wheeled portable sprayer. This description is made for disclosure purposes and is not intended to limit the present invention to wheeled sprayers.

II. Tank

As noted above, the sprayer 10 includes a tank 12 defining a reservoir 94 of sufficient size to hold the desired liquid in the desired quantity. The tank 12 of this embodiment includes a removable fill cover 140 mounted in the top of the tank 12. As perhaps best shown in FIG. 2, the tank 12 of the illustrated embodiment also defines two compartments 24a-b. The first compartment 24a is appropriately sized to house various components of the liquid delivery system 68, air delivery system 70 and control circuit 22 and the second compartment 24b is appropriately sized to house the battery 20. The compartments 24a-b may be closed by an upper cover plate 50 and a lower cover plate 51. The cover plate 50 may be removable attached, for example, by screws 142, to provide access to the components housed within the compartments 24a-b. The lower cover plate 51 is held at the bottom by two thumbscrews 143. The upper portion of the lower cover plate 51 fits under the lower portion of upper cover plate 50 so that it is securely held in proper position.

In this embodiment, various components of the liquid delivery system 68, the air delivery system 70 and the control circuit 22 are mounted to the upper cover plate 50. They could alternatively be mounted to the tank 12 or be unmounted. The tank 12 may be mounted on wheels 82 and include a handle 84 to permit the sprayer 10 to be easily moved from location to location. In this embodiment, the handle 84 and tank 12 are integrally constructed from high density polyethylene (HDPE). HPDE is generally resistant to degradation by a wide variety of chemicals. Depending upon the particular intended use, however, the construction material and capacity of the tank may be varied as appropriate. For instance, the tank may be composed of stainless steel to be more resilient to particularly corrosive chemicals. In the illustrated embodiment, the tank 12 includes a reservoir 94 having a capacity of approximately 10 gallons. However, tank volumes in the range of 5 to 50 gallons are typical for powered portable sprayers. Although this range of tank volumes is typical, the present invention extends to tank volumes outside of this range.

III. Liquid Delivery System

The sprayer 10 includes a liquid delivery system 68 that selectively moves liquid from the tank 12 to the mixing chamber 72. The liquid delivery system 68 generally includes a pump 14 for pumping liquid from the tank 12, a liquid withdrawal line 30 and a liquid supply line 38. Any of a wide variety of pumps may be incorporated into the present invention. In the illustrated embodiment, the sprayer 10 includes an electrically powered rotary pump 14 that is mounted to the tank 12 where it will remain separated from the liquid. One particular pump found suitable for this application is Model SLV10-AA41 available from SHURflo of Cypress, Calif. In this embodiment, the pump is a conventional rotary pump designed to operate on 12 volts DC. The pump 14 provides a flow rate of approximately 64 ounces per minute. As noted above, the present invention is not limited to sprayers 10 with electric pumps. Rather, alternative pumps may be used. For example, the present invention may include non-rotary electric pumps, such as a diaphragm or piston pump. As described in more detail below in connection with the control circuit 22, the pump 14 may include an integral pressure switch 204.

The pump 14 moves the liquid from the reservoir 94 to the spray gun 150 via withdrawal and supply lines. The liquid withdrawal line 30 includes a first end 90 connected to the inlet 92 of the pump 14 and a base 76 that is located near the bottom of the reservoir 94 within tank 12, so that the base 76 is below the liquid level in the tank during normal operation. The liquid supply line 38 and the liquid withdrawal line 30 may be manufactured from industrial grade rubber, PVC or other materials capable of withstanding the liquids intend to be applied by the sprayer 10. A filtering device 96 may be mounted to the base 76. For example, a screen or mesh may be mounted to the base to filter the liquid drawn into the liquid supply line 38. A weight 97 may be fitted over the liquid withdrawal line 30 to hold the base 76 at or near the bottom of the reservoir 94. If desired, the liquid withdrawal line 30 may include two segments 30a and 30b, such as in the illustrated embodiment. In this embodiment, the first segment 30a extends from the pump 14 to a bulk-head fitting 29 in the wall of the tank 12 and the second segment 30b extends from the opposite side of the bulk-head fitting 29 to a location near the bottom of the reservoir 94. The liquid supply line 38 includes a first end 86 connected to the outlet 93 of the pump 14 and a second end 88 connected to fitting 46 in the base of the spray gun 150. As described in more detail below, the fitting 46 places the liquid supply line 38 in communication with the mixing chamber 72, which is defined within the handle of the spray gun 150 in this embodiment. As illustrated, the liquid supply line 38 may be divided into two segments—a first segment 38a extending from the pump 14 to a bulk-head fitting 28 in the upper cover plate 50 and a second segment 38b extending from the bulk-head fitting 28 to the fitting 46 in the base of the spray gun 150. The bulk-head fitting 28 extends through the upper cover plate 50 from the interior to the exterior of the tank 12. The fitting 28 couples the two segments 38a and 38b, and provides a passage for liquid to flow between them. The fitting 28 may include an externally threaded body and a corresponding nut 152 for securing the fitting 28 in an opening defined through the upper cover plate 50. The fitting 28 may include a quick-connect adaptor on the exterior side so that the second segment 38b of the liquid supply line 38 can be easily attached to and removed from the tank 12.

In one embodiment, the system includes a three-way ball valve 145 to provide for priming of the pump 16. The handle 27 can be in one of two positions. When the handle is in the first position, the three-way ball valve re-circulates 145 the liquid through the pump 16 by way of the re-circulating inlet 147 which returns the liquid to the reservoir 94. When the pump 16 is fully primed, the user then moves the handle 27 to a second position, thereby opening the three-way valve 145, and allowing the liquid to reach the sprayer 150 by way of the hose 149.

IV. Air Delivery System

As noted above, the sprayer 10 includes an air delivery system 70 for delivering pressurized air to the spray gun 150, and more particularly to the mixing chamber 72 defined in the handle of the spray gun 150. The air delivery system 70 of the illustrated embodiment includes the compressor 16 and an air supply line 40 that extends between the compressor 16 and the mixing chamber 72. Any of a wide variety of compressors may be incorporated into the present invention. In the illustrated embodiment, the sprayer 10 includes an electrically powered diaphragm compressor 16 that is mounted to the upper cover plate 50. One particular compressor found suitable for this application is Model 107CDC20 available from Rietschle Thomas of Cheboygan, Wis. This compressor is powered by 12 volts DC and has a flow rate of approximately 1.4 cubic feet per minute. The compressor 16 is capable of providing air at approximately 35 pounds per square inch. The compressor 16 includes a conventional inlet filter 146 to filter air as it is being drawn into the compressor 16. The filter 146 is not, however, required. Although these particular compressor specifications have proven suitable for the illustrated application, the specifics of the compressor may vary from application to application. For example, another compressor suitable for similar applications is Model 007CDC13, also available from Rietschle Thomas of Cheboygan, Wis. As noted above, the present invention is not limited to diaphragm compressors. Rather, alternative portable sources of compressed air may be used. For example, the present invention may include a rotary electric compressor or a canister of compressed air.

In the illustrated embodiment, the air supply line 40 is divided into two segments 40a and 40b. The first segment 40a of the air supply line 40 extends from the outlet 98 of the compressor 16 to a bulk-head fitting 34 extending through the upper cover plate 50. The fitting 34 extends through the upper cover plate 50 from the interior to the exterior of the tank 12. The fitting 34 couples the two segments 40a and 40b, and provides a passage for air to flow between them. The fitting 34 may include an externally threaded body and a corresponding nut 100 for securing the fitting 34 in an opening defined through the upper cover plate 50. The fitting 34 may include a quick-connect adaptor (not shown) on the exterior side so that the second segment 40b of the air supply line 40 can be easily attached to and removed from the tank 12. The air supply line 40 may be manufactured from industrial grade rubber, PVC or other conventional materials. The air delivery system 70 may also include a check valve 44 to prevent the backflow of pressurized liquid through the air delivery system 70. The check valve 44 may be located at essentially any location upstream from the mixing chamber 72 and downstream from the compressor 16. For example, the check valve 44 may be located anywhere along the air delivery system flow path, such as in fitting 34 or along hose segment 40a or 40b. In the illustrated embodiment, the check valve 44 is located along hose segment 40b near the spray gun 150.

In the illustrated embodiment, the liquid supply line 38 and the air supply line 40 are two separate hose segments that are coiled and bound, side-by-side, in order to facilitate storage and to be less cumbersome during operation (See FIG. 1). The precise configuration of the hose segments 38 and 40 may, however, vary from application to application. For example, the two hose segments 38 and 40 need not be connected in a side-by-side configuration, but may be separate from one another or coaxial with one another, as desired.

In some applications, the liquid delivery system 68 and/or the air delivery system 70 may include a mechanism for controlling their respective flow rates. For example, either system may include a valve (not shown), such as a needle or pinch valve, located along the flow for selectively restricting the flow. This has the effect of allowing a wider range of operating conditions for the spray unit. Providing a flow constriction in the liquid line can reduce liquid consumption, while at the same time producing a foam with higher air content/expansion ratio. Alternatively (or in addition), the control circuitry may include components that permit control over the operating speed of the pump and/or compressor. By varying the operating speed of the pump and/or compressor, the flow rate and characteristics of the effluent can be controlled.

V. Spray Gun

In the illustrated embodiment, the present invention includes a generally conventional spray gun 150. FIG. 7a shows a partially sectional view of the spray gun 150. The internal structure shown in FIG. 7a is merely representative, and the actual structure may vary. The spray gun 150 generally includes a handle 80, a flow controller 42, a spray wand 160 and a nozzle 64. In this embodiment, the handle 80 is hollow defining the mixing chamber 72 for mixing the air and liquid. Spray exiting from the mixing chamber 72 is regulated by valve 52 and is actuated by the user with trigger 54. Trigger 54 may be held in the "open" position via a conventional locking mechanism (not shown). Trigger 54 may also be held in the "closed" position in order to prevent accidental spraying via a locking mechanism (not shown). The flow controller 42 is disposed downstream from the mixing chamber 72 and includes a trigger valve 52 for controlling the flow of effluent from the sprayer 10. Flow controllers 42 suitable for use in connection with the present invention are available from a variety of well-known suppliers, such as Root-Lowell Manufacturing Co., Lowell, Mich.

A chemical-resistant spray wand 60 is attached to the exit orifice 62 of the flow controller 42. Affixed to the outlet orifice (not shown) of the spray wand 60 is an adjustable nozzle 64. The spray nozzle 64 may be varied in geometry to produce different pressure drop-flow rate characteristics and/or spray patterns. Typical nozzles deliver flow rates of 0.05 to 0.30 liquid gallons per minute with pressure drops of 20 psi. Desirable spray patterns vary with application, but may include: a straight stream, a conical mist, or a fan pattern.

A mixing medium 50 may be disposed in the spray wand 60 to facilitate mixing of the air and liquid. The mixing medium 50 may be a small section of Scotch-Brite 8440 (available from 3M, Minneapolis, Minn.), and is typically a cylindrical segment in the size range of 1" long with a diameter of ½". The mixing medium 50 may be composed of different material, such as stainless steel wool. This would be appropriate when trying to increase the useful life of the mixing medium 50 prior to replacement, or when the spray fluid is relatively corrosive. The mixing medium 50 may also be varied in construction, having, for example, different mesh densities or mesh fiber sizes. This can have the effect of tailoring the resulting foam properties, according to the desired application, by varying, for instance, the foam consistency, foam expansion ratio, and/or foam bubble size distribution. In some applications, the mixing medium 50 may be disposed in other locations, such as the mixing chamber 72, or even entirely absent.

As shown, the liquid delivery system 68 and the air delivery system 70 are connected to the spray gun 150 via a fitting 46. FIG. 6 shows an enlarged partially-sectional perspective view of the fitting 46. The fitting 46 includes two inlet orifices 48a-b to accommodate the two hose segments 38 and 40, and one outlet orifice 49 through which the combined air and liquid may exit the fitting 46. The exit orifice 49 of fitting 46 may be either attached to the base 43 of the spray gun 150, or it may be disposed in other locations. The fitting 46 may include a threaded base 47 that is threadedly secured to the base 43 of the spray gun 150. The fitting 46 is merely exemplary and it may be replaced by alternate fittings or flow inserts capable of bringing together the air and liquid together or of bringing them separately to the mixing chamber 72 for combination.

The specific materials used to construct the various components of the sprayer 10 may vary from application to application. For example, the flow controller 42, delivery hoses 38 and 40, spray wand 60, and/or nozzle 64 may be composed of brass, stainless steel or other suitable materials. Brass and stainless steel may increase the strength and corrosion resistance of the part(s), as may be dictated by the particular application. Although the illustrated embodiment includes conventional commercial grade rubber hoses, the air delivery line 40 and liquid delivery line 38 may be varied in composition. The optimum hose selection may be application-specific and include considerations such as pressure rating, flexibility, cost, and resistance to chemicals. Some examples of alternate hose material include ethylene-propylene-diene monomer (EPDM), Hypalon, PVC, polyethylene and Teflon®.

Figure 7B:
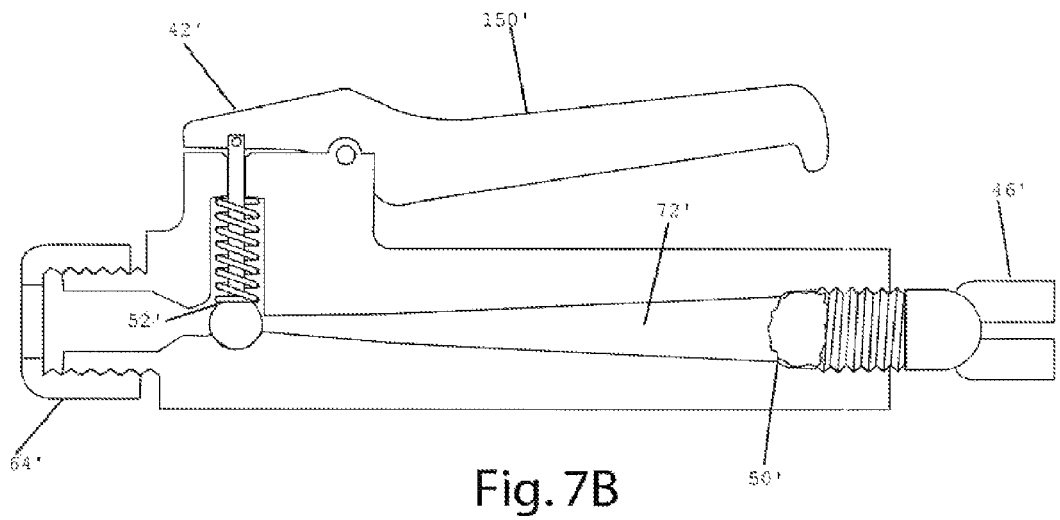
FIG. 7b is a sectional view an alternative flow controller showing the mixing chamber and the mixing media.
Figure 8:
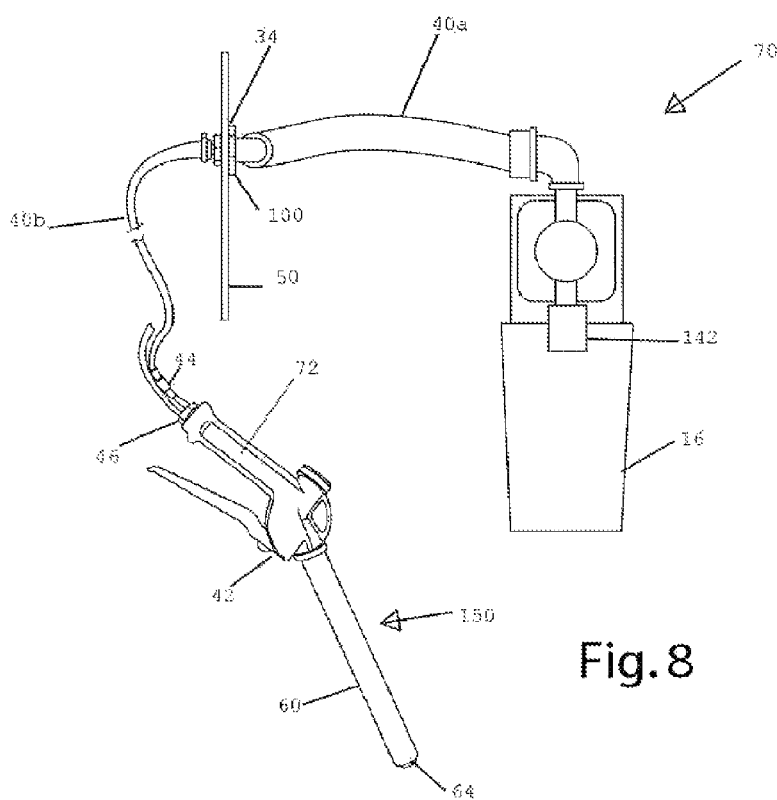
FIG. 8 is an illustration of the air delivery system.

The illustrated spray gun 150 is merely exemplary and alternative spray guns may be incorporated into the present invention. For example, an alternative spray gun 150' is shown in FIG. 7B. This embodiment includes a somewhat different flow controller 42' and valve 52'. Also, the spray wand 60 is eliminated and a nozzle 64' is connected directly to the outlet of the flow controller 42'. In this alternative embodiment, the mixing media 50' is located within the mixing chamber 72' upstream from the flow controller 42'. This embodiment also includes an alternative fitting 46' with side-by-side air and liquid entry inlets 170 and 172.

VI. Control Circuit

Figure 9:
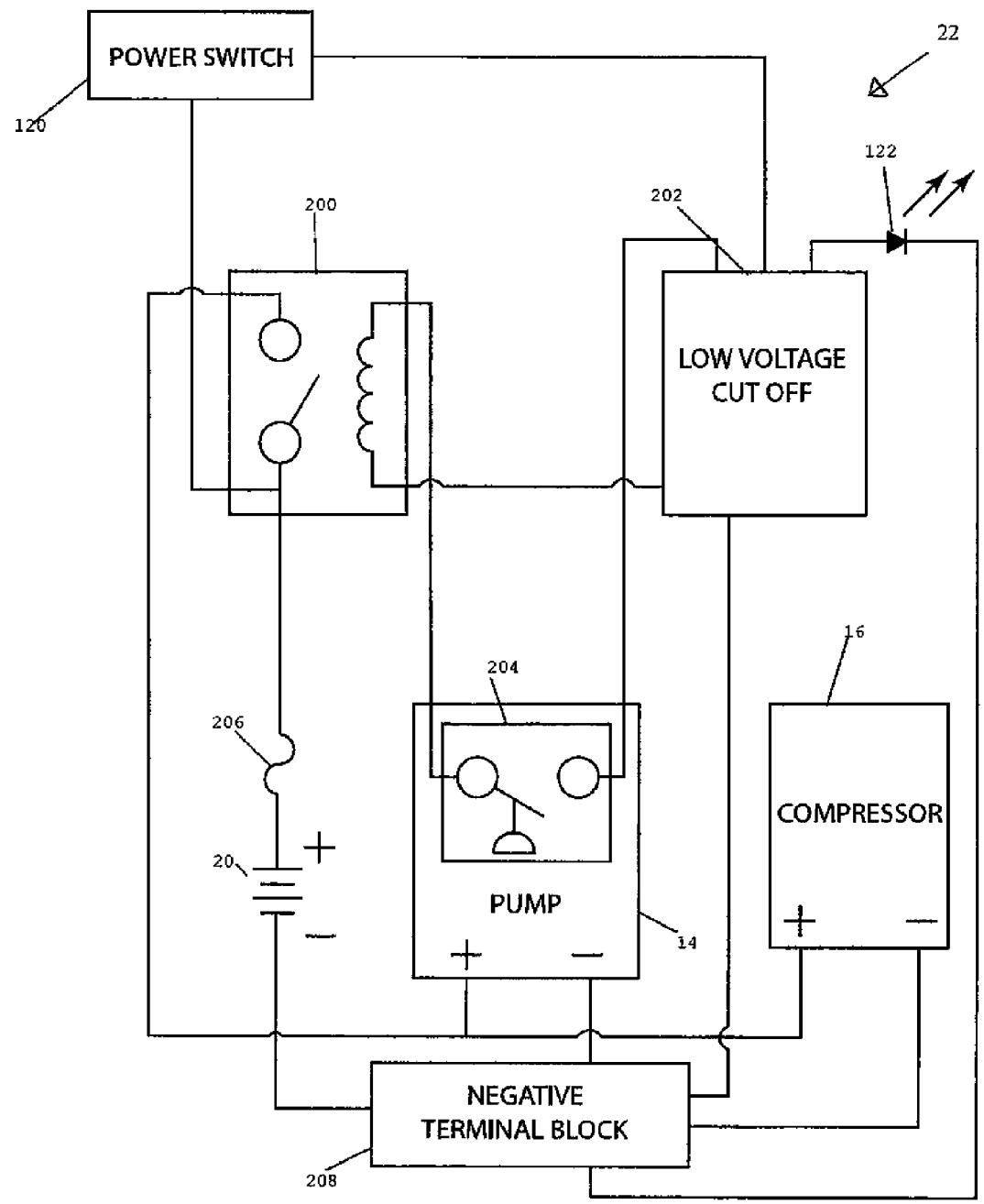
FIG. 9 is a schematic representation of the control system.

The sprayer 10 includes a control circuit 22 for controlling operation of the liquid delivery system 68 and the air delivery system 70. A schematic representation of the control circuit 22 is shown in FIG. 9. The control circuit 22 of the illustrated embodiment includes analog components, which may include some discrete components. The control circuit 22 could alternatively incorporate digital electronics. In the illustrated embodiment, the control circuit 22 generally includes a power supply, such as rechargeable 12 volt battery 20, a control switch 120 that controls the supply of power to the circuit 22, a fuse 206, and a low voltage cut off circuit 202 for turning on and off the two delivery systems 68 and 70 as appropriate. The illustrated control circuit 22 also includes a terminal block 208 to facilitate connection of various components to the negative terminal of the battery 20. Optionally, the circuit 22 includes an LED (light emitting diode) 122 to indicate whether the battery needs to be charged. Alternatively, a battery charge level indicator could be use in place of the LED 122. In this embodiment, pressure switch 204 integrated into liquid delivery system 68 for sensing the back pressure in the liquid line 38. In this embodiment, the pressure switch 204 is a conventional pressure switch that is integrated into the pump 14 by the supplier. The pressure switch 204 is electrically connected to a relay 200 or other functionally similar electronic components. In operation, actuation of the pressure switch 204 causes the relay 200 to either supply electricity to or disconnect the supply of electricity from the pump 14 and the compressor 16 substantially simultaneously. The pressure switch 204 is selected to actuate under the desired pressure. For example, in the illustrated embodiment, the pressure switch 204 actuates at 30 psi. When the pressure within the liquid line 38 exceeds 30 psi, the pressure switch 204 actuates the relay 128 which, for example in this embodiment, shuts-off the supply of electricity to the pump 14 and the compressor 16. When the pressure falls back below 30 psi, the pressure switch 204 actuates the relay 200 causing it to supply power to the pump 14 and the compressor 16. Alternatively, the pressure switch 204 could be mounted in the air delivery line 40 to sense pressure build-up within the air delivery line 40.

If the low voltage cut off circuit 202 detects that the voltage of the battery 20 is below a predetermined level, the low voltage cut off circuit 202 causes relay 200 to be turned off, thereby disabling the pump 14 and the compressor 16. The low voltage cut off circuit 202 then causes the LED 122 to be illuminated, providing to a user a visual indicator that the battery 20 should be replaced or recharged. The low voltage cut off circuit 202 could be, for example, any of the commonly available low voltage cut off modules, such as Model No. VMP012D-E-228 sold by Macromatic Industrial Controls, Inc. of Menomonee Falls, Wis. When the battery is low, the operator removes the bottom portion 51 for access to the battery.

As can be seen, the shut-off subcircuit 124 of the illustrated embodiment is pressure operated. The present invention may alternatively include other types of shut-off subcircuits. For example, the control circuit 22 may include a manually operated switch that allows the pump 14 and compressor 16 to be turned on and off manually.

VII. Operation

Spray is applied by turning on switch 120 and depressing the trigger 54 of the flow controller 42. This releases the pressure on the pressure switch 204. As a result, the pressure switch 204 is actuated causing the relay to supply power to the pump 14 and the compressor 16. The pump 14 and compressor 16 supply separate air and liquid streams in a segregated fashion to fitting 46 and thereafter the mixing chamber 72. The combined streams flow through the flow controller 42 and pass through the mixing media 50 in the spray wand 60. The mixing action creates a foam that is expelled from the spray gun 150 through the nozzle 64. The characteristics of the foam effluent depend in part on the flow rates/pressures of the air and liquid streams, the precise nature of the mixing medium 50, and the chemical composition of the spray liquid. Any of these characteristics can be selectively controlled to effectively vary the composition of the foam effluent. For example, less air will typically give the effluent a more fluidic character while more air will typically give the effluent a more foamy character. In some situations, it may be desirable to shut-off the supply of air and operate only the pump 14. This will typically result in a conventional liquid spray issuing from the spray nozzle 64.

During normal operation, the pump 14 develops sufficient pressure in the liquid supply line 38 to actuate the pressure switch 204 and shut off the pump 14 and compressor 16 shortly after the flow controller 42 is closed. More specifically, when the pressure in the liquid supply line 38 exceeds the threshold pressure of the pressure switch 204, the pressure switch 204 is actuated. This is in turn conveyed to the relay 128, which actuates to open the power supply circuits for the pump 14 and the compressor 16. As a result, the pump 14 and compressor 16 are disengaged.

In the absence of liquid (e.g. when the tank 12 is dry or the liquid withdrawal line 30 is leaking), the pump 14 may be incapable of generating sufficient pressure to actuate the pressure switch 204 even after the flow controller 42 is closed. If the pressure switch 204 is not actuated, the system may continue to run even after the flow controller 42 have been closed.

The illustrated embodiment is configured to address this risk. In short, the illustrated embodiment is configured to permit pressurized air to backflow into the liquid supply line 38 where it can actuate the pressure switch 204. As shown, the illustrated embodiment includes a check valve 44 along the air supply line 40 to prevent the backflow of pressurized liquid into the air delivery system 70. However, in this embodiment, there is no check valve along the liquid supply line 38. Accordingly, pressurized air can backflow into the liquid supply line 38. During normal operation, the liquid will be provided at a pressure significantly higher than that of the pressurized air. As a result, pressurized air does not backflow into the liquid supply line 38 during normal operation.

The sprayer 10 may also include one or more of a variety of conventional sprayer accessories. For example, in some applications, the tank 12 may include an orifice (not shown) designed to accommodate an external feed line to facilitate filling of the tank 12. As a more specific example, the tank 12 may include an attachment fitting (not shown) for a conventional garden hose fitted through the wall of the tank 12. This would facilitate the safe, rapid filling of the reservoir, in particular when the spray fluid is a solution composed primarily of water. The above description is that of a preferred embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The embodiments of the invention in which an exclusive property or privilege is claimed are defined as follows:

1. A self-contained, powered sprayer for generating a foam effluent comprising:
   a tank defining a reservoir for holding a liquid, said tank including wheels to facilitate movement of said tank;
   a spray gun having a flow controller and defining a mixing chamber, said spray gun having an exit for said foam effluent, said mixing chamber substantially located near the exit, said flow controller having a manually operable valve for selectively controlling flow of effluent from the sprayer;
   a pump mounted to said tank, said pump having an inlet and an outlet;
   a liquid supply line extending from said pump to said flow controller;
   a liquid withdrawal line extending from said pump to said reservoir;
   a compressor mounted to said tank;
   an air supply line extending from said compressor to said flow controller;
   a one-way check valve preventing liquid from back-flowing out of the mixing chamber down the air supply line, said liquid supply line permitting two-way flow whereby pressurized air is capable of back-flowing down the liquid supply line if the tank is dry, the pump runs out of liquid, or the liquid line is leaking; and
   a control means for engaging and disengaging said pump and said compressor in response to manual operation of said flow controller.

2. The sprayer of claim 1 wherein said control means includes a pressure switch configured to actuate in response to pressure in at least one of the liquid supply line and the air supply line.

3. The sprayer of claim 2 wherein said control means further includes a relay for substantially opening and closing power supply circuits to said pump and said compressor in response to input from said pressure switch.

4. A powered self-contained sprayer for generating a foam effluent comprising:

a tank for containing a liquid;

a flow controller;

a nozzle, said nozzle having an exit;

an electrical power storage device, an electrical pump for pumping the liquid from said tank to said flow controller via a liquid line, said pump receiving electrical power from said electrical power storage device;

an electrical compressor for supplying pressurized air to said flow controller via an air line, said electrical compressor receiving electrical power from said electrical power storage device;

a cutoff system for terminating operation of said pump and said compressor, wherein pressurized air from said electrical compressor is capable of back-flowing through said liquid line when the tank is dry or when the electrical pump is leaking, wherein said cutoff system includes a pressure switch, wherein said pressurized air is adapted to actuate said pressure switch; and a mixing chamber, wherein said liquid line and said air line separately supply air and liquid to said mixing chamber, said mixing chamber substantially located near the nozzle exit.

5. The portable sprayer of claim 4 further including a control means for substantially simultaneously engaging said pump and said compressor.

6. The portable sprayer of claim 5 further including a control means for substantially simultaneously engaging said pump and said compressor in response to actuation of said flow controller.

7. The portable sprayer of claim 6 wherein said control means includes a pressure switch operatively connected to at least one of said liquid line and said air line.

8. The portable sprayer of claim 7 wherein said control means include a relay electrically connected to said pressure switch, whereby actuation of said pressure switch results in actuation of said relay.

9. The portable sprayer of claim 8 wherein said relay is operable between a first position in which said pump and said compressor are electrically connected to said electrical power storage device and a second position, in which said pump and said compressor are electrically disconnected from said electrical power storage device.

* * * * *